No. 690,549. Patented Jan. 7, 1902.
M. H. BALLARD.
BUFFING MACHINE.
(Application filed July 16, 1901.)
(No Model.)

Witnesses:
H. B. Davis.
John W. Deerout.

Inventor:
Milton H. Ballard
by B. J. Myers
Atty.

UNITED STATES PATENT OFFICE.

MILTON H. BALLARD, OF LYNN, MASSACHUSETTS, ASSIGNOR TO GEORGE W. EMERSON AND COMPANY, OF LYNN, MASSACHUSETTS.

BUFFING-MACHINE.

SPECIFICATION forming part of Letters Patent No. 690,549, dated January 7, 1902.

Application filed July 16, 1901. Serial No. 68,520. (No model.)

*To all whom it may concern:*

Be it known that I, MILTON H. BALLARD, of Lynn, in the county of Essex and State of Massachusetts, have invented an Improvement in Buffing-Machines, of which the following description, in connection with the accompanying drawings, is a specification, like characters on the drawings representing like parts.

This invention relates to buffing-machines of that type having a rotatable longitudinally-reciprocating shaft bearing one or more buffing-rolls, and has for its object to improve and simplify the construction of the mechanism employed for reciprocating the rotatable shaft.

Figure 1:
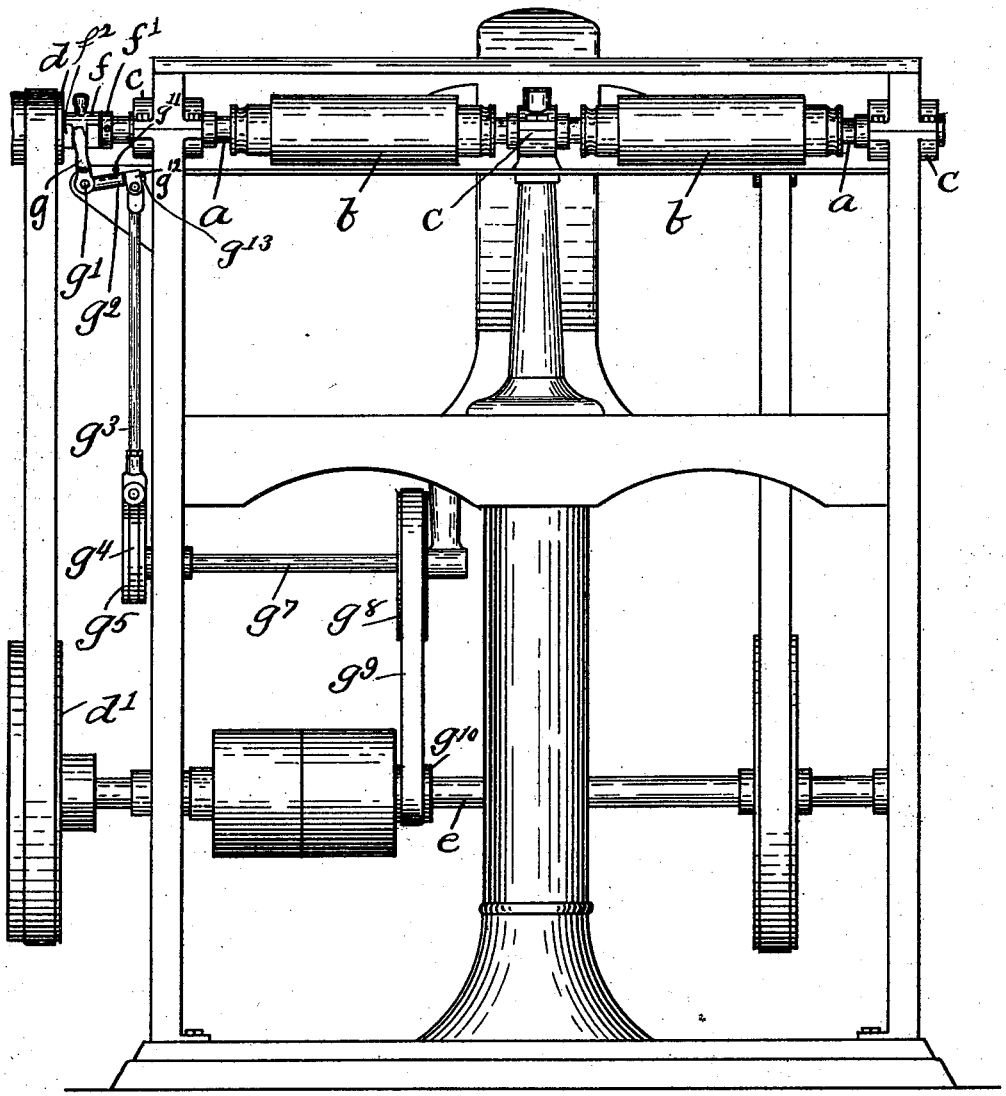
Figure 3:
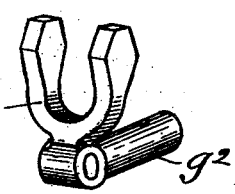
Figure 2:

Figure 1 shows in front elevation a buffing-machine embodying this invention. Figs. 2 and 3 are details to be referred to.

$a$ represents the shaft, herein shown as bearing two buffing-rolls $b$ $b$. This shaft is mounted in boxes $c$, supported by the main framework, and is free to rotate and also slide longitudinally in said boxes.

To the shaft $a$ a belt-pulley $d$ is secured, over which a belt passes, which passes around a belt-pulley $b'$ on the main driving-shaft $e$. A sleeve or collar $f$ is loosely mounted on said shaft $a$, which is held in a predetermined position thereon by any suitable means—as, for instance, it may be disposed between the belt-pulley $d$ and a fixed collar $f'$, so that the shaft $a$ may turn freely within said sleeve, yet said sleeve will move longitudinally with the shaft. The sleeve or collar $f$ has on each side of it two projections or ears $f^2$, disposed to provide a space between them, and between the ears of each pair the upper extremities of the arms of a yoke $g$ are disposed, said yoke being pivoted at $g'$ to a bracket on the frame and forming one arm of a bell-crank lever, and the other arm $g^2$ of said bell-crank lever is connected by an eccentric-rod $g^3$ with the strap or ring $g^4$ of an eccentric $g^5$, secured to a shaft $g^7$, to which a belt-pulley $g^8$ is secured, over which a belt $g^9$ passes, which in turn passes around a belt-pulley $g^{10}$ on the main driving-shaft. The adjacent sides or faces of the ears or lugs $f'$ are formed parallel, as shown in Fig. 1, and the upper ends of the arms of the yoke $g$ are made widest at a point substantially midway the upper and lower ends of the ears, as at 2, Fig. 2, being gradually reduced in width above and below such point, so that the ends of said arms are free to work in the space between the ears as the bell-crank lever is turned on its pivot, yet to snugly hug the ears when in either of their extreme positions. By thus making the arms there will be no lost motion or play, which would result in a sudden shock on each movement of the arm. To compensate for wear, the stroke of the bell-crank is made variable, and, referring to Fig. 3, the arm $g^2$ of said bell-crank lever is provided at its extremity with a shouldered screw $g^6$, fitting a threaded socket in the end of the arm and held therein by a set-screw $g^{11}$, and the upper end of the eccentric-rod $g^3$ has loosely connected to it a block $g^{12}$, which is loosely fitted onto said shouldered screw and held in position thereon by a nut $g^{13}$.

I claim—

1. In a buffing-machine, the combination of a rotatable longitudinally-reciprocating shaft bearing one or more buffing-rolls, of means for rotating said shaft, and means for reciprocating it longitudinally consisting of a pivoted bell-crank lever, one arm of which engages a sleeve on the shaft, and the other arm of which is connected by an eccentric-rod with the strap or ring of an eccentric, a shaft bearing said eccentric, disposed in parallelism with the main driving-shaft, a belt-pulley on said shaft and belt passing over said belt-pulley and over a belt-pulley on said main driving-shaft, substantially as described.

2. In a buffing-machine, the combination of a rotatable longitudinally-reciprocating shaft bearing one or more buffing-rolls, means for rotating said shaft, and means for reciprocating it longitudinally consisting of a sleeve on the shaft having a pair of ears at each side, a pivoted bell-crank lever, one of the arms of which is made as a yoke which works between said ears, the extremities of said arms being formed widest at points substantially midway the upper and lower ends of the ears and reduced in width above and below said widest portion, an eccentric-rod connecting said bell-crank lever with a strap or ring on an eccentric, a shaft bearing said eccentric and means for rotating said shaft, substantially as described.

3. In a buffing-machine, the combination of a rotatable longitudinally-reciprocating shaft bearing one or more buffing-rolls, of means for rotating said shaft, and means for reciprocating it longitudinally consisting of a pivoted bell-crank lever, one arm of which engages a sleeve on the shaft, and the other arm of which is connected by an eccentric-rod with the strap or ring of an eccentric, a shaft bearing said eccentric, and means for rotating said shaft, and means for varying the stroke of said bell-crank lever to compensate for wear, substantially as described.

In testimony whereof I have signed my name to this specification in the presence of two subscribing witnesses.

MILTON H. BALLARD.

Witnesses:
B. J. NOYES,
JOHN W. DECROW.